Oct. 9, 1973  C. SCHROTER ET AL  3,764,440
FILM SPLICING PRESS AND STICKER SUPPLY THEREFOR
Filed Dec. 16, 1971  5 Sheets-Sheet 4

INVENTORS
CARL SCHRÖTER
BY ECKHARD MULFINGER

Thomas M Marshall
ATTORNEY

United States Patent Office

3,764,440
Patented Oct. 9, 1973

3,764,440
FILM SPLICING PRESS AND STICKER SUPPLY THEREFOR
Carl Schroter, Rommelshausen, and Eckhard Mulfinger, Stuttgart-Uhlbach, Germany, assignors to Heinrich Hermann, Stuttgart-Wangen, Germany
Filed Dec. 16, 1971, Ser. No. 208,691
Claims priority, application Germany, Apr. 10, 1971, P 21 17 495.8
Int. Cl. G03d 15/04
U.S. Cl. 156—505
7 Claims

ABSTRACT OF THE DISCLOSURE

Self-adhesive film splicing stickers are supplied disposed in pairs on a carrier tape, each sticker having an uncoated separable tab at each end. A positioning perforation is provided on each tab and the perforation of the two tabs of one sticker differ in size, while the perforations of the respective tabs of the two members of a pair of stickers differ in shape. Together with the disposition of perforations in the body of the sticker corresponding to perforations in the film ends to be joined, the aforesaid perforations assure that the pair of stickers will be properly placed in a film splicing press, in which opposed ridge structures on the hinged jaws of the press carry positioning bosses corresponding to the perforations of the sticker tab. A film guiding unit is hinged between the jaws of the press and carries a guide channel for the film ends. Bevelled projections in this channel are adapted to engage film perforations. One side of the guide channel can be moved away against a spring to release the spliced film.

This invention concerns stickers and hand presses for splicing of motion picture film. More particularly, it concerns stickers coated with pressure sensitive adhesive and arranged in pairs on a carrier tape coated to reduce adhesion and also hand-operated and hand-fed splicing presses, for use with such stickers, consisting of upper and lower jaws and an interposed film guide and also having a film cutting device on the upper jaw for preliminary trimming of the film ends.

Devices for the purpose of splicing strips or cuttings of film are known in which the film is held fast by its perforations on positioning pins, in order to bring the film ends in the correct relative position for splicing, and in which the splice is made by applying stickers to the top and bottom of the film ends. The stickers are either unrolled from a tape and cut apart or else are taken piece by piece from a carrier tape and stuck onto the film cuttings by hand. In some known devices, hooks or registering pins are used to grasp the stickers for applying them to the juxtaposed film ends.

In the case of narrow films of 8 mm. or super 8 size used by amateur photographers, both the positioning of the film ends on the positioning pins and the application of the self-adhesive stickers are unusually difficult and usually leave fingerprints on the film ends and on the stickers. When a sticker is taken off a carrier tape, moreover, the adhesive coating of the sticker is usually touched with the fingers, resulting in appreciable reduction of adhesive force. Furthermore, the camber of the normally rolled-up film often causes the film ends to come off the positioning pins during splicing. The manipulation of very small stickers and their placement for a correctly fitting product requires a great deal of skill, because the stickers must be aligned right on the film and in this operation readily fall into a false position.

The problem to which the invention is directed is to provide a self-adhesive film splicing sticker that can be taken off a carrier tape in such a way that touching of the adhesive layer is avoided and so that the stickers can be brought on to the film ends in correct registry without touching the film itself with the fingertips. The invention also has the object of providing a film splicing press in which the ends of film strips can be inserted without touching the film emulsion and are then trimmed, after which the film strips can be fastened together by means of applying stickers and pressing the assembly to achieve a correctly registering splice.

The solution of the problem is found in the provision of film splicing stickers which are coated with a pressure sensitive adhesive, have tabs on both ends for handling and positioning, and are arranged in pairs on a carrier tape which has a coating that rejects or mitigates adhesion. The body of each sticker is provided with perforations corresponding to some of the film perforations and is connected on each end to a tab by a weakened strip which allows the tab to be neatly torn off after the splice is removed from the press.

The tabs are preferably provided with positioning perforations through which corresponding projections in a film splicing press can hold the sticker in place. Since stickers must be applied to both top and bottom sides of the film and in each case with the adhesive side of the sticker next to the film, it is advantageous to shape the tab perforations of one sticker of a pair differently from those of the other sticker of the pair and also to differentiate the perforations of the two tabs of each sticker, in order to assure that the sticker is always placed in the film splicing press with the adhesive coated side next to the film.

The film splicing press developed for utilization of the stickers just described consists of a loyer jaw unit, an upper jaw unit hinged thereon and carrying a film cutter, and a film guide unit hinged in between. On the floor of the lower jaw unit, a ridge block is mounted aligned in the direction in which the film is to be laid. In the center of the top of this ridge block a flat surface is provided, of a width corresponding to that of a film splicing sticker, slightly raised above the rest of the ridge top. On both sides of the raised portion, guide projections are located on the ridge block which correspond to the perforations of the tabs of the sticker for the underside of the splice. On one side of the ridge an abutting block is provided to form a step on which the film guide unit can rest. On the roof of the upper jaw unit, another ridge structure is provided which matches the ridge block on the lower jaw unit. The upper ridge structure, however, is hollow to house the filmcutter and has a slit on the slightly protruding flat portion in the center to permit passage of the cutter knife. Again, guide projections are located on the surface at either side of the protruding central portion to fit the perforations of the tabs of the other sticker of the pair, i.e. the sticker for the upper side of the splice as it is made in the press.

The film guide unit has a film guide channel running parallel to the hinge axis of the press. This channel is bounded by a fixed wall having a rabbet at the bottom and the similarly rabbeted movable wall of a movable member pressed by a spring, toward the film guide channel, up against a stop.

In the film guide channel positioning bosses are preferably provided to fit the film perforations. It is advantageous for these to be beveled off towards the respective ends of the film guide channel, so that when the two film ends are inserted into the guide channel they will slide over the respective bevelled faces and can fall into position when the perforation is reached.

In order to prevent the film from binding at the wall of the film guide channel when inserted, the wall is preferably cut away in the neighborhood of the positioning bosses.

The film cutter preferably has a key type lever having a cap projecting through the upper jaw unit of the press which serves as the operating button for the film cutter. A bead on the other end of the lever serves as the fulcrum and two spring mounting studs, arranged on positioning arms on each side of the lever near the knife blade, mount helical springs which hold the blade out of engagement, in the absence of pressure on the cap button. The positioning arms, springs and knife blade are housed inside the hollow ridge member of the upper jaw unit of the press. When the cap button of the lever is pressed down, the knife of the cutter passes down through the slit in the ridge member and cuts the film.

For further explanation of the film splicing sticker and the film splicing press of the present invention, reference is made to illustrative embodiments of these respective aspects of the invention shown in the annexed drawings, in which.

Figure 1:
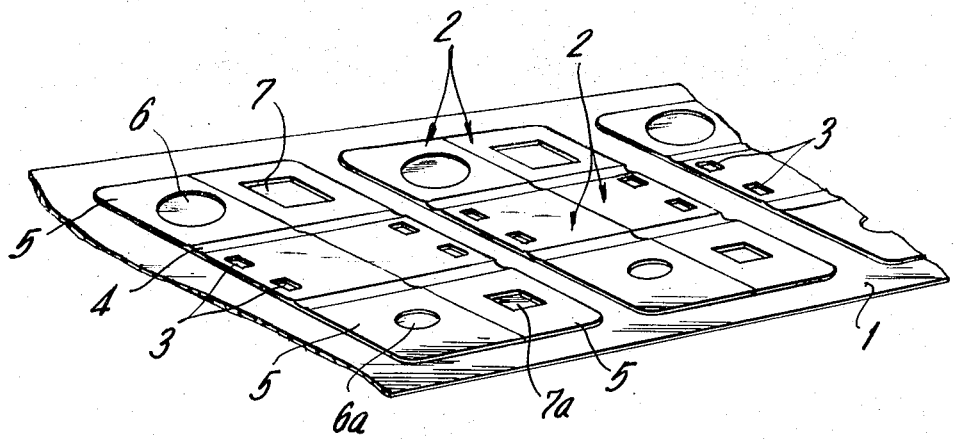
FIG. 1 is a perspective view of a carrier tape on which self-adhesive film splicing stickers are disposed.
Figure 6:
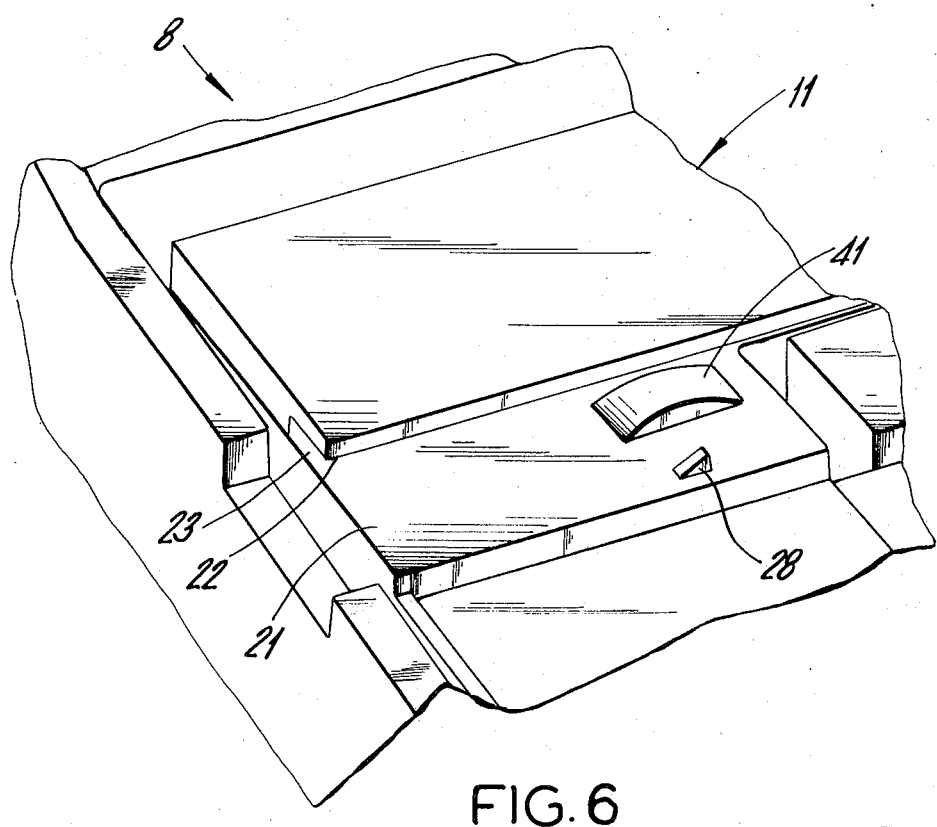
FIG. 6 is an enlarged partial perspective view of the guide channel.

The film splicing stickers 2 shown in FIG. 1 are disposed in pairs on a carrier tape 1, which has a coating that rejects or mitigates adhesion. The stickers 2 are provided with perforations 3 that correspond to the perforations of the films to be spliced. Tabs 5 are provided on both ends of stickers 2 in the direction of the film. These are connected with stickers 2 by means of connecting strips 4 so that the tabs 5 can be readily torn off. The tabs are composed of a synthetic sheet material or some other suitable material and are not covered with an adhesive layer. The strips 4 may be formed by indenting otherwise weakening the tab material.

The tabs have perforations 6, 6a and 7, 7a. Perforations 6 and 6a are circular and are of different diameter. They correspond to the similarly rounded bosses 14 and 14a on ridge member 12 of lower jaw unit 8. Perforations 7 and 7a are square and not of the same side length. They correspond in shape to bosses 20 and 20a on the surface of ridge member 16 of upper jaw member 9.

Lifting stickers 2 off carrier tape 1 is accomplished by grasping tabs 5. This assures that the sticker 2 is not touched by the fingertips either on its upper side or on its adhesively coated underside.

Figure 2:
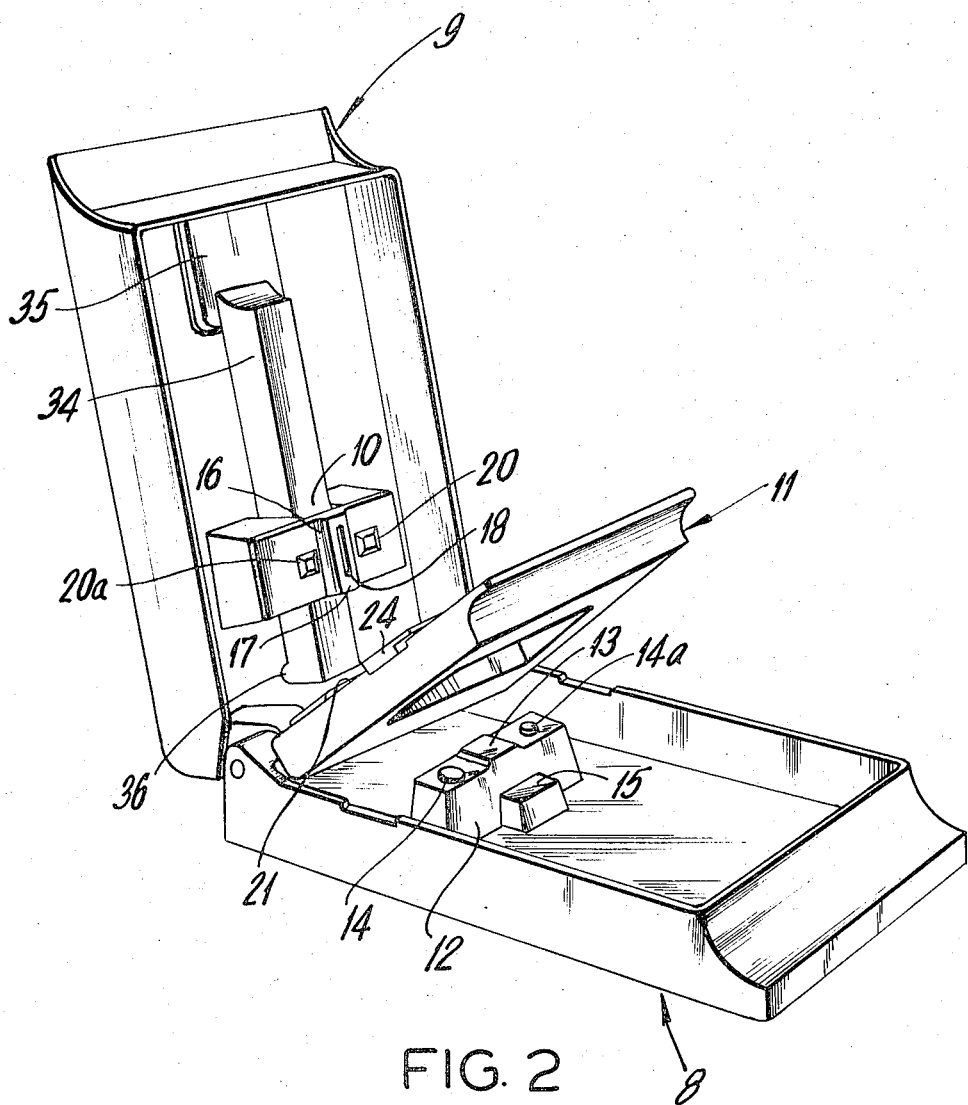
FIG. 2 is a perspective view of an open film splicing press.

The film splicing press, as shown in FIG. 2, consists of a box-shaped lower jaw unit 8 on which is hinged a likewise box-shaped upper jaw unit 9, and a film guide unit 11 hinged in between lower jaw unit 8 and upper jaw unit 9. A film cutting device 10 is located on upper jaw unit 9.

In the bottom of the lower jaw unit 8 is located ridge member 12 with its long dimension corresponding to that of the film. On the surface of this ridge member a slightly raised plane surface 13 is centrally located which corresponds in size to the dimensions of a splicing sticker. On either side of raised surface 13 are bosses 14 and 14a for positioning perforations 6 and 6a of tabs 5 of one sticker 2 of a pair. Abutting one side of ridge block 12 is step block 15 for seating film guide unit 11.

On the interior side of the roof of the box-shaped upper jaw unit 9, the housing of film cutting device 10 has an external shape that in a large measure corresponds to that of ridge block 12 in lower jaw unit 8 and may be referred to as a ridge structure 16. In the protruding plane surface 17 a slit 18 is provided for the passage of film cutting knife blade. On both sides of surface 17 are bosses 20 and 20a for positioning perforations 7 and 7a of tabs 5 of the other sticker 2 of a pair. The film cutting device 10 is described in more detail below with reference to FIG. 7.

Figure 3:
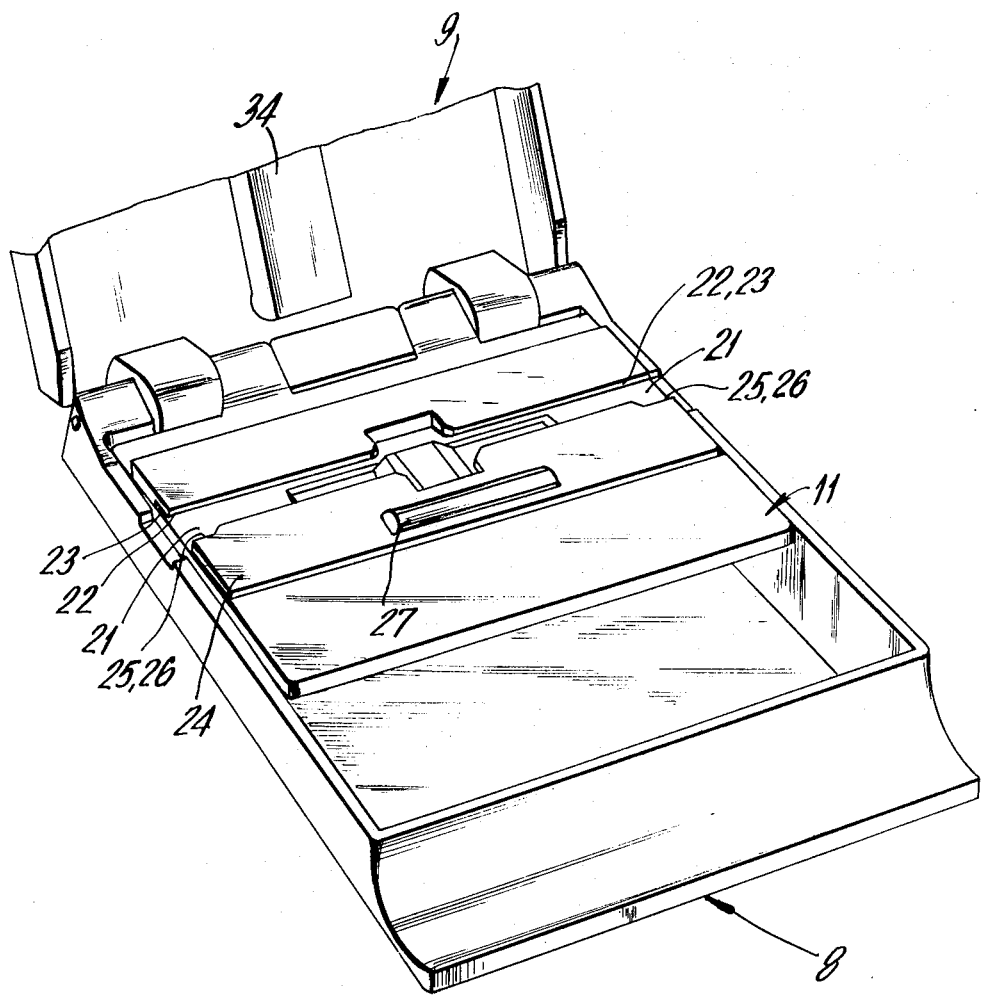
FIG. 3 is an enlarged perspective view of the film guide unit.
Figure 4:
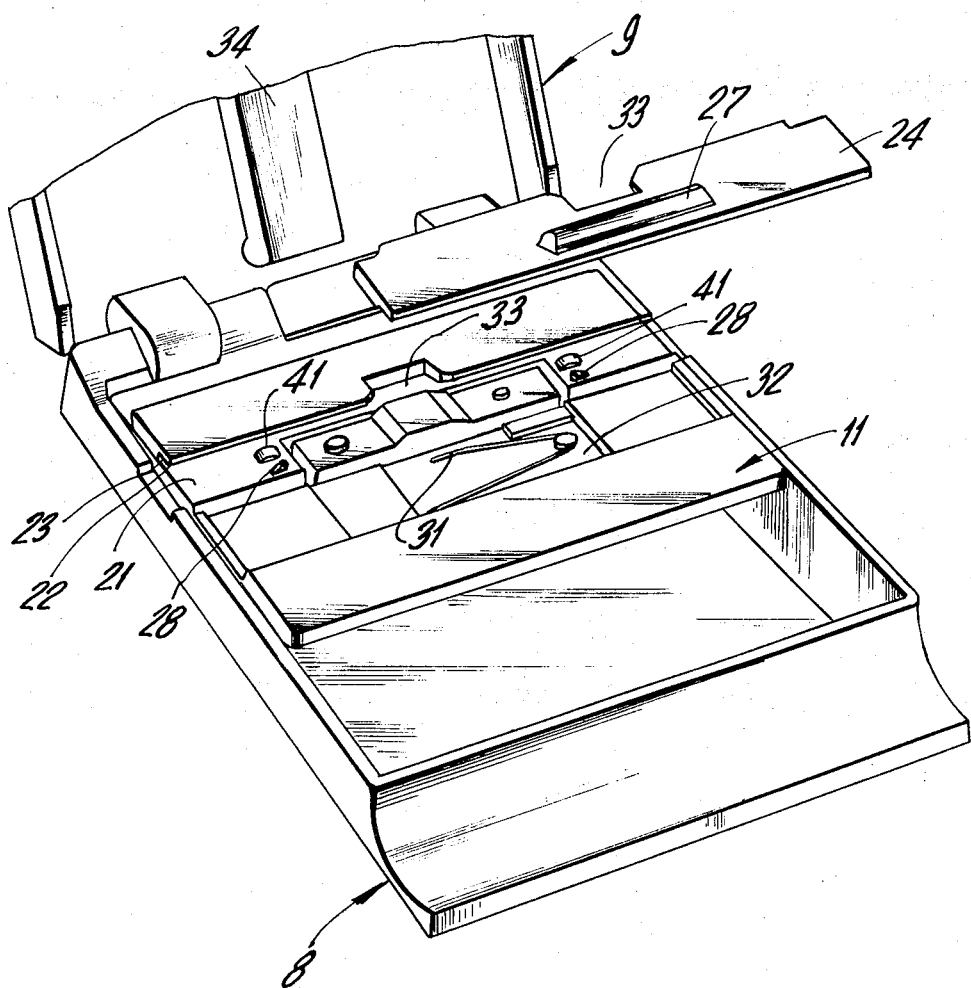
FIG. 4 is a view like FIG. 3 in which, however, the movable member defining the film guide channel has been removed.
Figure 5:
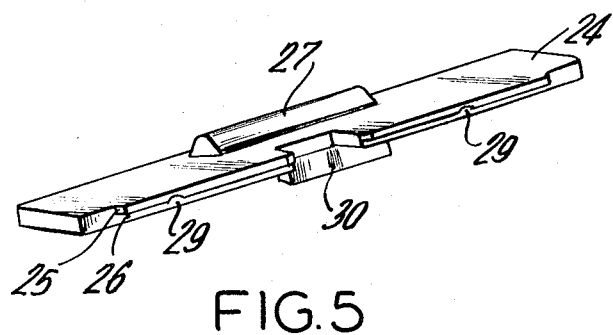
FIG. 5 is a perspective view of the movable member of the film guide unit.

As shown in FIG. 3, the pivotally mounted film guide unit 11 has a film guide channel 21 which is bounded on one side by a fixed wall 22 that has a rabbet 23 at the bottom and on the other side by the movable wall 25, having a rabbet 26, of movable member 24. As shown in FIG. 4 movable member 24 is seated in film guide unit 11 so as to be pressed by the force of spring 31, which is seated in cavity 32, towards film guide channel 21 so far as permitted by the stop 30 formed as part of member 24 (see FIG. 5). Movable member 24 can be drawn back from film guide channel 21 by pulling on hand grip 27 so that the film can be removed from channel 21 after splicing.

In film guide channel 21 are located bevelled positioning projections 28 which correspond to the perforations of an inserted film. Channel wall 25 has cavities 29 in the neighborhood of positioning member 28 so that when a film end is introduced the latter can slide in rabbet 26 above positioning projections 28.

In film guide channel 21 holding bosses 41 are also provided which constrict the channel upward to hold the film by friction and oppose undesired displacement of the film. As shown in FIG. 3, the walls 22 and 25 which form the boundaries of film guide channel 21 are so cut away in the region of the slightly raised plane surfaces 13 and 17 of ridge structures 12 and 16 of the lower and upper jaw members 8 and 9 respectively, that a window 33 is formed so as to allow the plane surfaces 13 and 17 to close together tightly on the film splice when the splicing press is closed.

As shown in FIG. 2, the film cutting device consists of a lever 34, on one end of which there is a cap button 35 which protrudes through a corresponding aperture in the roof of upper jaw unit 9 and serves as a pushbutton or key for actuating the film cutting device. At the other end of the lever 34 is a bead 36 on which the lever can be rocked for a distance by pressure on the cap 35, since the bead 36 butts against the roof of upper jaw unit 9.

Figure 7:
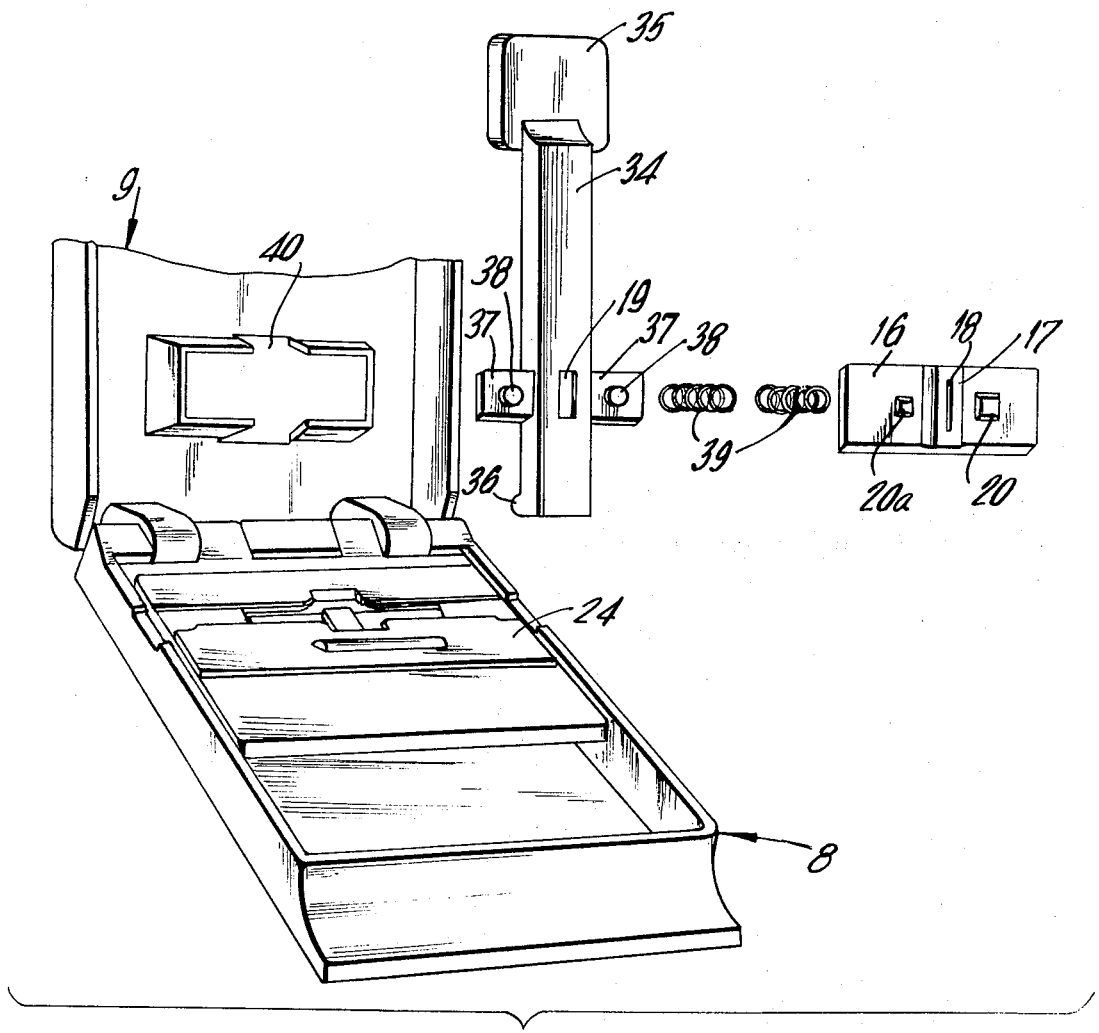
FIG. 7 is an exploded perspective drawing of the film cutting device of the film splicing press.

As shown in FIG. 7, on the portion of lever 34 that fits beneath ridge structure 16 in the cavity 40 are provided positioning arms 37 on which spring bearing bosses 38 are mounted. Seated on bosses 38 are helical springs 39 which press at one end against the arms 37 and at the other end against the underside of the shell of ridge structure 16. The knife blade 19, fixed on lever 34 midway between the positioning arms 37, is thus held outside of the slit 18 of the raised plane surface 17 so long as the film cutting device is not actuated.

For the splicing of the film ends the latter are inserted respectively at each end of the guide channel, far enough for the two ends to overlap in the middle. Then the film splicing press is closed and the film is cut by pressing on cap button 35 of lever 34. The film splicing press is then reopened and both film splicing stickers of a pair of positioned with perforations 6, 6a, 7 annd 7a of the respective tabs 5 on the respective bosses 14, 14a and 20 and 20a. Next the film splicing press is again closed and the stickers 2, which are now seated with their uncoated sides respectively on the raised plane surfaces 13 and 17, are caused to adhere to the film by the pressure of these surfaces against the film ends. Then, after reopening the press, by drawing back movable member 24 away from guide channel 21 by grip member 27 the spliced film can be removed and tabs 5 of the splice stickers 2 on both sides of the film and both ends of the splice can be pulled off.

What is claimed is:

1. A film splicing press of the type comprising lower and upper jaw units hinged together at one edge, said upper jaw unit carrying a film cutting device, and a film guide unit hinged between said jaw units in which press:
   (a) ridge structures are provided inwardly extending respectively inside each jaw unit opposite each other, each having a raised plane central portion corresponding in size to a film splicing sticker and having positioning bosses adapted to fit film splice sticker tabs disposed each side of said raised portion;
   (b) a step adapted to seat said film guide unit is disposed abutting one side of said ridge structure in said lower jaw unit, and
   (c) said ridge structure in said upper jaw unit is hollow, houses the blade of said film cutting device in the latter's unoperated position and has a slit in said raised portion of said structure through which said blade is adapted to pass when said film cutting device is operated.

2. A film splicing press as defined in claim 1 in which said film guide unit has a film guide channel oriented parallel to the axis about which said jaw members are hinged and in which said channel is bounded on one side by a fixed wall having a rabbet widening said channel at the bottom and by a similarly rabbetted wall of a movable member arranged with a spring and a stop adapted to maintain said movable member normally in film guiding position and to permit said movable member to be shifted in a direction away from said fixed wall for removal of film after completion of a splice.

3. A film splicing press as defined in claim 2 in which positioning projections adapted to fit film perforations are provided on the bottom surface of said film guide channel.

4. A film splicing press as defined in claim 2 in which said positioning projections are bevelled away, in each case towards the nearer end of said film guide channel.

5. A film splicing press as defined in claim 3 in which the said rabbet of said wall which is nearer to said projections is upwardly cut away or enlarged in the vicinity of said projections, whereby film that may be inserted into said channel may more readily ride up the bevelled surfaces of said projection.

6. A film splicing press as defined in claim 2 in which bosses are provided in said channel of a shape such as to provide a smooth upward construction thereof and of a height adapted to provide frictional restraint of an inserted film end against displacement.

7. A film splicing press as defined in claim 1 in which said upper jaw unit has an aperture through which said film cutting device is adapted to be actuated and in which said film cutting device comprises:
   (d) a key-type lever having an actuator cap at one extremity and disposed so that said cap extends through or is accessible through said aperture;
   (e) a bead at the other extremity of said lever adapted to serve as a fulcrum by rocking against an inside surface of said upper jaw member;
   (f) a knife blade protruding from said lever on the side thereof opposite to the side on which said cap and said bead are located and disposed in registry with said slit in said ridge structure in said upper jaw unit;
   (g) positioning arms extending out from said lever in the neighborhood of said knife blade on the respective sides of said lever intermediate between the sides on which said knife blade is carried and the side on which said cap and said bead are provided;
   (h) spring seating bosses respectively on each of said positioning arms, and
   (i) springs respectively between each of said spring seating bosses and the inside of the summit of said ridge structure of said upper jaw unit adapted to oppose the actuating force applied to said lever to prevent protrusion of said knife blade through said slit when said lever is not actuated.

References Cited
UNITED STATES PATENTS

| | | | |
|---|---|---|---|
| 3,709,079 | 1/1973 | Würker | 83—375 |
| 3,050,107 | 8/1962 | Barry et al. | 156—486 |
| 3,290,201 | 12/1966 | Jorgensen | 156—505 |
| 3,607,571 | 9/1971 | Tange | 156—505 |

GEORGE, F. LESMES, Primary Examiner

W. R. DIXON, JR., Assistant Examiner

U.S. Cl. X.R.

156—517, 159